(12) United States Patent
Snowdon et al.

(10) Patent No.: US 6,777,358 B2
(45) Date of Patent: Aug. 17, 2004

(54) SEALING GLASS COMPOSITION

(75) Inventors: Kenneth Snowdon, Chelmsford (GB); Christopher Tanner, Suffolk (GB); Timothy Durrant, Paignton (GB); Christopher Woodend, Paignton (GB)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 10/205,657

(22) Filed: Jul. 25, 2002

(65) Prior Publication Data

US 2004/0018930 A1 Jan. 29, 2004

(51) Int. Cl.$^7$ .............................. C03C 3/23; C03C 8/10; C03C 8/22
(52) U.S. Cl. ............................. 501/43; 501/15; 501/22; 501/25; 501/26; 501/44; 65/59.1; 65/406; 65/412
(58) Field of Search ............................. 501/14, 15, 17, 501/21, 22, 24–26, 41, 43, 44, 49, 57, 58, 60, 61; 65/59, 406, 41

(56) References Cited

U.S. PATENT DOCUMENTS

| | | | |
|---|---|---|---|
| 3,964,920 A | * | 6/1976 | Davis et al. ................... 501/15 |
| 4,131,478 A | | 12/1978 | Davis et al. ................... 106/53 |
| 4,310,357 A | | 1/1982 | Matsuura et al. .............. 501/15 |
| 4,774,208 A | * | 9/1988 | Yamanaka et al. ............. 501/15 |
| 4,855,261 A | * | 8/1989 | Mizuno et al. ................ 501/76 |

FOREIGN PATENT DOCUMENTS

| | | |
|---|---|---|
| JP | 3125971 | 10/1996 |
| RU | 2053211 | 1/1996 |

* cited by examiner

Primary Examiner—Karl Group
Assistant Examiner—Elizabeth A. Bolden
(74) Attorney, Agent, or Firm—Barnes & Thornburg (57) ABSTRACT

A glass composition for a seal consists essentially of 70–75 wt % of PbO, 3–7 wt % of $PbF_2$, 5–8 wt % of $Bi_2O_3$, 5–7 wt % of $B_2O_3$, 2–5 wt % of ZnO, 1–3 wt % of $Fe_2O_3$, 0–2 wt % of CuO, 0–2% of $TeO_2$, and a trace <0.2% of $MnO_2$, the composition having a flow temperature of <350° C. Such seals can be flowed at low temperatures, using different and less environmentally damaging constituents to those used before. Damage to temperature sensitive materials near the seals, can be reduced. Low flow temperatures can be achieved without excessive degradation of properties such as low viscosity, low expansion coefficient, good adhesion to glass and metals, low permeability of air, good long term hydrolytic stability. A filler such as a ceramic powder, is added to match the temperature expansion coefficient to the materials being sealed. It can be used to fix silica fiber into electro-optic devices to achieve hermetic joints with high mechanical stability.

13 Claims, 4 Drawing Sheets

FIG 4, MANUFACTURING PREFORM.

FIG 5, USING PREFORM TO CREATE SEAL.

SEALING GLASS COMPOSITION

RELATED APPLICATIONS

This invention relates to copending U.S. patent application Ser. No. 09/698,800 (Nortel Networks ref 12686 entitled "GLASS FIBER FIXATIVE AND FIXING PROCESS", hereby incorporated by reference in its entirety.

FIELD OF THE INVENTION

This invention relates to glass compositions for seals, to sealing compositions including the glass composition and fillers, to methods of manufacturing such compositions, to methods of manufacturing a seal, to optical components having such seals, and to methods of offering a data transmission service over a fiber having such a seal.

BACKGROUND TO THE INVENTION

Forming a good seal with a strong bond between an optical fiber and an optical component is important as many optical components are subject to harsh operating conditions including vibration, high humidity and temperature cycling. Several problems are associated with the bonding process between a glass material and a non-glass material generally, and the high design specifications for optical components exacerbate these problems.

For example, temperature variations require any bond formed ideally to match the thermal coefficients of expansion of the optical fiber and the bonded part to mitigate thermal stress on the optical fiber. Determining the composition of a glass fixative having a sufficiently low melting point to enable an optical fiber to be bonded to a non-glass material without deforming the optical fiber, having a desired thermal coefficient of expansion, and good adhesive properties to both the silica of the optical fiber and the non-glass material is a difficult and complex task. Alternative processes using solder compounds such as Sn/Pb alloys were employed instead.

Most optical components include parts which have a non-glass composition, for example, metallic materials such as Kovar. One known method of bonding glass to such metallic materials requires the glass fiber to be metalised. The metalisation process required a fiber to be stripped to its core and given a metallic coating consisting of a bonding layer and a soldering layer. This enables bonds between the metalised glass fiber and the Kovar material to be soldered.

Metalisation processes have several disadvantages. The fibers have to have their adhesion verified and any masking material used must be removed. Such metalisation processes are time consuming and the fiber strength can be significantly reduced as a result (typically for example by 30%). Other disadvantages include the extensive handling of fibers required by such processes and the associated high fiber breakage rate, and the capital expenditure on plant required by such processes. The preparation of the fibers for metalisation and soldering is moreover time-consuming Yet another disadvantage of fiber fixing using metalisation processes is that no reworking is possible during either the metalisation or soldering stages. A further disadvantage of metalisation processes for fiber fixing is that the soldering process can leave behind potentially corrosive fluxes. The soldering process usually involves the use of acidic, organic fluxes and the organic residues can adversely affect laser or optical performance if not cleaned off effectively.

The cleaning process itself can cause concerns for product performance which need addressing. These processes also have the effect of weakening the fiber because of the pre-cleaning required and because of stress concentrators associated with the metalisation. The softer solders can suffer creep and hence be detrimental to alignment stability. In complex optical components, a further problem is the necessity of preventing preexisting bonds from being degraded when subsequent bonds are formed in the near vicinity.

Alternatives have also been developed such as resin fixing-uvlight and/or heat curing. However, the resins have poor high temperature performance and lengthy cure cycles with messy dispensing and out gassing during processing.

The bonds must often be sufficiently strong and intact to form a hermetic seal between the optical fiber and the corresponding portion of the optical component to isolate the interior of the optical component from the external atmosphere. This enables the atmosphere within the optical component to be isolated and for non-air atmospheres or pure air atmospheres to be used. Moreover, the moisture content of the interior can then be controlled. It is thus important for any bond formed to be sufficiently strong to retain the hermeticity of the seal when subject to thermal stress and/or vibration and/or shock.

An example of a typical requirement is to provide a means for passing an optical fiber hermetically (<1×10−9 Atmos cc/s) through the wall of a package. At the same time the fiber should not be weakened and the optical performance of the fiber should be unimpaired. Another challenge is to provide a quick, simple and reliable means of fixing a fiber position very accurately (sometimes to less than 0.1 um) subsequent to alignment and keeping it there for the lifetime of the product. The fixing method should be clean in itself and the resultant assembly should be chemically, mechanically and optically stable.

One current technique for sealing fiber tails to optical components without metallising the fibers involves using a low melting point glass to make a hermetic seal between the fiber and a Kovar hypo tube. To carry out this operation a glass preform is heated to 450° C. approximately in an induction coil. The nominal sintering temperature to manufacture the glass preform is 310° C.

An example of a commercially available low melting point (LMP) glass usable for the hermetic seal, developed by NEG (Nippon Electric Glass), is shown in U.S. Pat. No. 5,346,863. It involves a PbO $B_2O_3$ type glass matrix, mixed with a ceramic filler powder to reduce the temperature coefficient of expansion (TCE) to match the glass and metal materials being bonded. Due to environmental pressures there is a need for alternative or better glasses,

SUMMARY OF THE INVENTION

It is an object of the present invention to provide improved apparatus and methods. According to a first aspect of the present invention, there is provided a sealing glass composition consisting essentially of: 70–75 wt % of PbO, 3–7 wt % of $PbF_2$, 5–8 wt % of $Bi_2O_3$, 5–7 wt % of $B_2O_3$, 2–5 wt % of ZnO, 1–7 wt % of $Fe_2O_3$, 0–2 wt % of CuO, 0–3% of $TeO_2$, and a trace <0.2% of $MnO_2$, the composition having a flow temperature of <350° C.

An advantage of this is that it can be used to make seals which can be flowed at low temperatures, using different constituents to those used in prior compositions. This helps reduce the risk of damage to temperature sensitive materials near the seals, for example polymer coatings of optical fibers. Also, this composition can achieve such low flow temperatures without excessive degradation of other useful properties such as low viscosity, low TCE, good adhesion to glass and metals, low permeability of air, good long term hydrolytic stability, and so on. It can be mixed with a filler such as a ceramic powder, to enable the TCE to be matched accurately to the materials being sealed.

It can be used to fix silica fiber into electro-optic devices to achieve hermetic joints and to give high mechanical stability fixing of the fiber and other optical train related components for example. It can be heated to flow to form a seal using a Nd/YAG, $CO_2$ or diode laser, hot plate, hot air and induction heating. Of these the preferred heat sources are induction heating and the Nd/YAG laser. It can give substantial cost reduction, performance improvement and new design options whilst being quick, clean, repeatable and stable. It has many possible applications. The process and materials are much more environmentally friendly than prior processes and materials. Material delivery can be in various forms including powder, preform and paste (allowing screen printing options).

As a preferred feature for a dependent claim, the temperature coefficient of expansion is between 4 and 12 ppm/°C. This is another key property to ensure long term reliability of the seal in realistic conditions of temperature changes. This TCE is the value before matching by adding filler. It is useful to keep this value low so that the proportion of filler can be kept low, since the filler usually increases the flow temperature significantly, for example by 10° C. for each 1% of filler.

As another preferred feature for a dependent claim, the glass composition has one or more of $V_2O_5$, $P_2O_5$, $TeO_2$, $SnO_2$, $Co_3O_4$, $Li_2O$ $As_2O_3$, $Sb_2O_3$ This corresponds approximately to table 1 below.

As another preferred feature for a dependent claim, the glass composition, having 5 to 15 wt % $B_2O_3$, 5 to 16 wt % $Bi_2O_3$, 5 to 9 wt % ZnO, 2 to 8 wt % F, and 2 to 5 wt % $TeO_2$.

This corresponds approximately to mix T-3 of table 3 below.

As another preferred feature for a dependent claim, the glass composition has 6 to 7 wt % $B_2O_3$, 7 wt % $Bi_2O_3$, 3 to 4 wt % ZnO, 5 to 6 wt % F, 1 to 2 wt % $Teo_2$, 0.15 wt % $MnO_2$, 2 to 3 wt % $Fe_2O_3$ and 1 to 2 wt 4 CuO.

This corresponds to mix "C" of table 5 below.

Another aspect of the invention provides a composition comprising 70–99 wt % of the glass composition, and 1–30 wt % of a ceramic filler, the composition having a TCE of 1 to 5 ppm/° C. and a flow temperature of less than 400° C.

As a preferred feature for a dependent claim, the composition has sufficient adhesion to glass and to metal to withstand a bend test of 3 mm deflection, 2 mm from the seal.

As another preferred feature for a dependent claim, the composition has a durability sufficient to maintain seal hermeticity <1×10–9 Atmos cc/s without optical power losses of packaged devices after high humidity exposures after 2000 hrs at 85° C. and 85%RH, according to standard test procedures such as MIL-STD-883 Method 103.

As another preferred feature for a dependent claim, the composition has a hermetic seal level of <1×10$^{-4}$ Atmos cc/s.

Another aspect of the invention provides a seating glass composition consisting essentially of:

70–75 wt % of PbO,
3–7 wt % of $PbF_2$,
5–8 Wt % of $Bi_2O_3$
5–7 Wt % of $B_2O_3$
2–5 wt % of ZnO
1–3 wt % of $Fe_2O_3$
0–2 wt % of CuO
0–2% of TeO2 and a trace <0.2% of $MnO_2$

Another aspect of the invention provides a method of manufacturing the composition comprising the steps of: mixing the PbO, and metal oxide components, reacting the mixture with ammonium bifluoride to create $PbF_2$, and adding a low TCE ceramic filler.

Another aspect of the invention provides a method of manufacturing a seal using the composition, comprising the steps of placing a preform of the composition over a gap to be sealed, and applying localized heating to cause the preform to flow into the gap.

As another preferred feature for a dependent claim, the localized heating can be induction heating or laser heating.

Another aspect of the invention provides an optical component having a seal having the above mentioned composition.

Another aspect of the invention provides a method of offering a data transmission service over an optical network along an optical fiber sealed using the composition As the advantages of the invention can enable a better network, which is more reliable or more cost effective for example, consequently a data transmission service over the network can show a corresponding improvement, and the value of such services can increase. Such increased value over the life of the system, could prove far greater than the sales value of the equipment.

Any of the features can be combined with any of the aspects of the invention as would be apparent to those skilled in the art. Other advantages will be apparent to those skilled in the art.

BRIEF DESCRIPTION OF THE DRAWINGS

To show by way of example how the invention can be implemented, embodiments will now be described with reference to the figures in which.

DETAILED DESCRIPTION OF PREFERRED EMBODIMENTS

Figure 1:
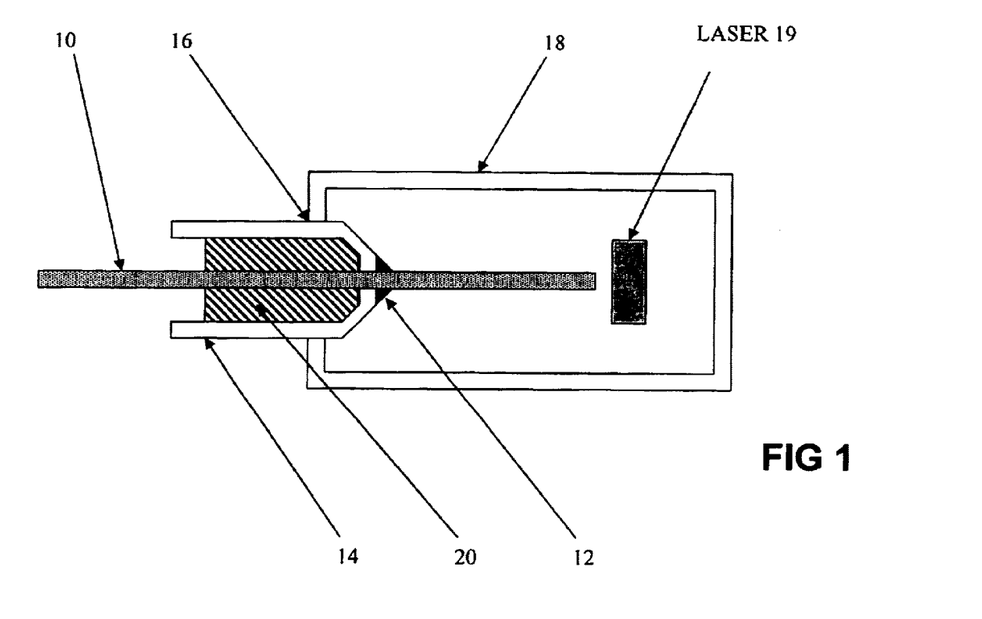
FIG. 1 shows an optical fiber sealed to optical component package, using a sealing composition according to a first aspect of the invention.

FIG. 1, Optical Fiber Sealed to Optical Component Package

Referring now to FIG. 1 of the accompanying drawings, a glass element, here an optical fiber 10 is bonded and sealed by a sealing composition 12 to a non-glass material element, here a hypo tube 14. The hypo tube 14 is well known and comprises a non-glass material, for example Kovar, which is a nickel/iron alloy. In other embodiments of the invention other materials may be bonded to the optical fiber. The purpose of the hypo tube is to enable the fiber to be gripped and handled with less risk of damage during assembly.

The hypo tube 14 is bonded to walls of an optical component package 18, either using another sealing composition or a solder bond 16. Within the package 18, the optical fiber 10 extends from the hypo tube 14 towards an optical component, for example a laser chip 19, which may transmit and/or receive optical signals. The correctly positioned optical fiber enables optical signals to be communicated between the optical component and the environment external to the package. The optical fiber is supported generally within the hypo tube 14 by a filler material 20, for example, a resin. It is important that the optical fiber 10 is firmly maintained in a position relative to the optical component, so that optical signals can be communicated with minimal insertion loss. However, other supporting structures or just the glass bond itself may be the source of support in alternative embodiments.

Properties of the Sealing Composition

The sealing composition is carefully formulated to have a suitable softening and melting temperatures, good adhesion to glass and the corresponding non-glass material, a desirably low viscosity, and an appropriate thermal expansion coefficient to provide a strong compressive bond. These characteristics enable a strong, long-lasting bond to be provided between the glass material element and non-glass material element which are to be fixed.

The characteristics of the sealing composition for bonding the optical fiber 10 to the Kovar tube 14 were selected to ensure that the bond is hermetic, strong, resilient and matches the thermal coefficients of expansion of both the glass of the optical fiber and the Kovar material. The viscosity is low to enable the bond to form by melted glass flowing in a capillary manner along the tube. The glass fixative also has good adhesion to the glass fiber and the Kovar tube. The composition of a suitable glass fixative is based on a glass composition or matrix, and a filler, as described in more detail under a separate heading below.

It is important that a strong bond is formed with the optical fiber 10, i.e., that a compression joint is formed. However, if too strong a bond is formed the fiber will be subject to stress and may break. Such stresses can, in addition to generating fiber breakage, also result in the light transmission properties of the optical fiber being degraded. This is a particular problem in polarization maintaining fibers To ensure that a stable compressive, hermetic seal is formed by the sealing composition around the fiber 10 in the Kovar hype tube 14, the TCE of the composition must match that of the Kovar (6 $MK^{-1}$ (6 to 6.5 p.p.m./° C.)) and the silica optical fiber, for which the TCE is typically 0.5 p.p.m/° C. If the TCEs cannot be sufficiently matched, then when the whole optical assembly is cooled down after processing, the differential in amounts of and rates of contraction may cause the optical fiber to be damaged and/or the hermeticity of the seal broken by cracking or loss of adhesion.

Generally, glasses which have low melting points such as are required by the invention have much higher TCEs. This is overcome by the inclusion of a TCE modifying substance such as lead titanate, lead calcium titanate, niobium titanate or beta euocryptite which lowers the TCE to the desired range.

Whilst the melting temperature of the sealing composition can be selected to lie in the range, 280° C. to 350° C., it is desirable if the upper processing temperature does not exceed 300° C. This temperature is sufficiently low to ensure that a polymeric fiber coating, for example, acrylic or Hytrel™ thermoplastic polyester elastomer, is not damaged when the bond is formed. Ideally, therefore, the flow temperature of the sealing composition lies in the range 280° C. to 350° C. This temperature range also enables the Kovar tube joint to be soldered subsequently to the package walls 16 without damage to the sealing composition bond 12, as the softening point temperature and glass transition temperature are higher than the reflow processing temperature of eutectic tin/lead solder (typically 220° C). This enables the Kovar tube joint to retain its hermetic seal when subjected to subsequent assembly steps (i.e., the glass bond 12 remains intact).

Restricting the processing temperature to this range limits the composition of the glass fixative to a relatively narrow range, as many glasses do not have the desired combination of a melting point in this range together with a sufficiently low viscosity and adhesion to the Kovar or glass fiber.

Composition of the Glass Matrix

A family of glasses based on a mixed Lead Oxide/Lead Fluoride/Lead Borate system was investigated. Most glasses of these types have at least four constituents and often can have many more. The use of these various oxides is important as they have significant effects on the physical properties of the glass i.e. altering its TCE, reducing its flow temperature. Typical oxide additives include boron, zinc, magnesium, copper, silicon, aluminium, indium and many others. With the exception of fluoride, other metal salts were not considered. By including an appropriate proportion of bismuth oxide, the softening temperature can be lowered, and a glass with the correct viscosity created which can flow around the Kovar tube and silica glass fiber. Copper oxide and zinc oxides also help stabilize the melt and prevent de-vitrification. In addition, zinc oxide increases the environmental stability of the glass seal in ambient atmospheres during use.

Fillers.

The matrix glasses based on lead oxide/fluoride all have TCE values of between 10 ppm ° C. to 18 ppm ° C. As the TCE s of the glass fiber and Kovar hypo-tube are 0.5 ppm and 6.8 ppm respectively, a filler must be added to the matrix glass to lower its overall TCE to provide a closer match to the 2 materials being bonded, ideally close to the midpoint of the TCEs of these 2 materials.

Filler TCE values are usually very low (<1 ppm) and in some cases can be negative. Fillers based on lead titanate have a TCE value of −8 ppm ° C. A typical embodiment of the glass composition can have a TCE of 15.4 $MK^{-1}$ (15.4 ppm/° C.). For example, filler particles may be included at the level of anything up to 55% volume fraction to the glass composition particles in the sealing composition, though preferably less than 25%. The particle size distribution is typically centered around 5 microns.

Analytical Techniques

Several different analytical techniques were used in this work both XRF X-ray fluorescence) and wet chemical analysis were carried out together with X-ray crystallography and Particle size analysis. Chemical durability was also checked in case the glass dissolves in acidic environments.

TABLE 1

Trials based on NT27

| | NT #27 | 27-A | 27-B | 27-C | 27-D | 27-E | 27-F | 27-G | 27-H | 27-I | 27-J | 27-K | 27-L |
|---|---|---|---|---|---|---|---|---|---|---|---|---|---|
| $B_2O_3$ | 7 | 7 | 7 | 7 | 7 | 7 | 7 | 7 | 7 | 7 | 7 | 7 | 7 |
| PbO | 75 | 73 | 73 | 73 | 72 | 73 | 73 | 74 | 73 | 73 | 73 | 72 | 72 |
| $Bi_2O_3$ | 10 | 9 | 9 | 9 | 9 | 9 | 9 | 10 | 9 | 9 | 9 | 9 | 9 |
| ZnO | 8 | 7 | 7 | 7 | 8 | 7 | 7 | 8 | 7 | 7 | 7 | 7 | 7 |
| $V_2O_5$ | | 4 | | | | | | | | | | | |
| $P_2O_5$ | | | 4 | | | | | | | | | | |

TABLE 1-continued

Trials based on NT27

| | NT #27 | 27-A | 27-B | 27-C | 27-D | 27-E | 27-F | 27-G | 27-H | 27-I | 27-J | 27-K | 27-L |
|---|---|---|---|---|---|---|---|---|---|---|---|---|---|
| TeO₂ | | 4 | | | | | | | | | | 3 | 2 |
| SnO₂ | | | 4 | | | | | | | | | | |
| CuO | | | | 4 | | | | | | | | | |
| Co₃O₄ | | | | | 4 | | | | | | | | |
| Li₂O | | | | | | 1 | | | | | | | |
| As₂O₃ | | | | | | | 4 | | | | | | |
| Sb₂O₃ | | | | | | | | 4 | | | | | |
| Fe₂O₃ | | | | | | | | | 4 | | | | |
| PbF2 | | | | | | | | | | | | 2 | 3 |

TABLE 2

Flow temperatures of the glasses listed in Table 1.

| Glass | Colour | Flow Temperature/° C. |
|---|---|---|
| NT #27 | Dark Orange | 360 |
| 27-A | Orange | 365 |
| 27-B | Yellow | 370 |
| 27-C | Green | 345 |
| 27-D | Yellow | 380 |
| 27-E | Dark Green | 350 |
| 27-F | Black | >400 |
| 27-G | Opaque Orange | >400 |
| 27-H | Yellow | Attacks Platinum |
| 27-I | Amber | 375 |
| 27-J | Orange | 370 |
| 27-K | Green | 300 |
| 27-L | Yellow-Green | 295 |

From the above results it was decided to concentrate on a glass based upon 27-L.

TABLE 3

Glass melts (250 Grams) in Weight %

| Nominal Comp. | T-1 | T-2 | T-3 | T-4 | T-5 |
|---|---|---|---|---|---|
| B₂O₃ | 9 | 7 | 7 | 25.22 | 6.42 |
| PbO | 80.4 | 69 | 70 | 52.24 | 50.46 |
| PbF₂ | 3.6 | 5 | 5 | — | 18.35 |
| Bi₂O₃ | — | 9 | 8 | — | 9.17 |
| ZnO | 7 | 7 | 7 | 22.54 | 7.34 |
| TeO₂ | — | 3 | 3 | — | 2.75 |
| CuO | — | — | — | — | 0.92 |
| NH₄HF₂ | — | — | — | — | 4.59 |

T5 Had extra fluoride added as Ammonium Bifluoride to try to lower the flow temperature even further.

TABLE 4

Flow Temperatures for the glasses shown in table 3.

| Glass | Flow Temperature/° C |
|---|---|
| T-1 | >303 |
| T-2 | >304 |
| T-3 | 277 |
| T-4 | 465 |
| T-5 | >305 |

These first trials produced a significant reduction in the flow temperature from the earlier melts with the exception of T4 which was an attempt to lower the lead content of the glass. The next series of trials used T3 as a starting point.

TABLE 5 nominal compositions of second series of glass melts in weight %

| Nominal Comp. | Glass A | Glass B | Glass C | Glass D | Glass E | Glass F |
|---|---|---|---|---|---|---|
| B₂O₃ | 7 | 7 | 6.5 | 7 | 6.5 | 6.5 |
| PbO | 78 | 70 | 72.5 | 70 | 72.5 | 72.5 |
| Bi₂O₃ | — | 8 | — | 8 | 7 | 6 |
| ZnO | 7 | 7 | 3.2 | 7 | — | 4 |
| PbF₂ | 5 | 5 | 5.2 | 5 | 6 | 6 |
| TeO₂ | 3 | — | 1.5 | — | — | 1 |
| In₂O₃ | — | 3 | — | — | — | — |
| MnO₂ | — | — | 0.15 | — | — | — |
| Fe₂O₃ | — | — | 2.5 | — | 2.5 | 2.5 |
| CuO | — | — | 1.45 | — | 1.5 | 1.5 |
| Ag₂O | — | — | — | 3 | — | — |
| ZnCl₂ | — | — | — | — | 4 | — |

TABLE 6

Measured Flow Points for the glasses listed in table 5.

| Glass | Melting Point/° C. |
|---|---|
| A | 270 ± 5 |
| B | 290 ± 5 |
| C | 265 ± 5 |
| D | 282 ± 5 |
| E | >307 ± 5 |
| F | 275 ± 5 |

The second series of glasses with the exception of glass E all produced flow temperatures well below 300° C. E was tried to see if a mixed chloride and fluoride salt could be used From these results it was concluded that to obtain a glass with a sufficiently low flow temperature, a glass based upon a lead oxide/lead fluoride would be preferred and that two glasses should be used for preform trials. These were T3 from Table 3 and C from Table 5.

Fluoride added to the formulations was via the addition of hydrofluoric acid or ammonium bifluoride.

Filler Materials.

Two filters were chosen for the initial additions to the matrix glass. These were fused silica (TCE of 0.7 ppm). The other was lead titanate (TCE of −8 ppm). From calculations it was thought that it would require a level of about 50% by weight in the case of silica to give the required TCE level. In the case of the lead titanate, calculations indicated that the level would be around 20% by weight for this material. Particle size and distribution of the filler can also have a significant effect on obtaining the overall desired TCE.

Chemical Analysis

Chemical analysis of several of the melted glass samples showed no significant losses in the glass mixing and melting. The good correlation with nominal compositions of these glasses indicated a minimal loss of Fluorine and Boron referenced in tables 3 and 5.

Figure 2:
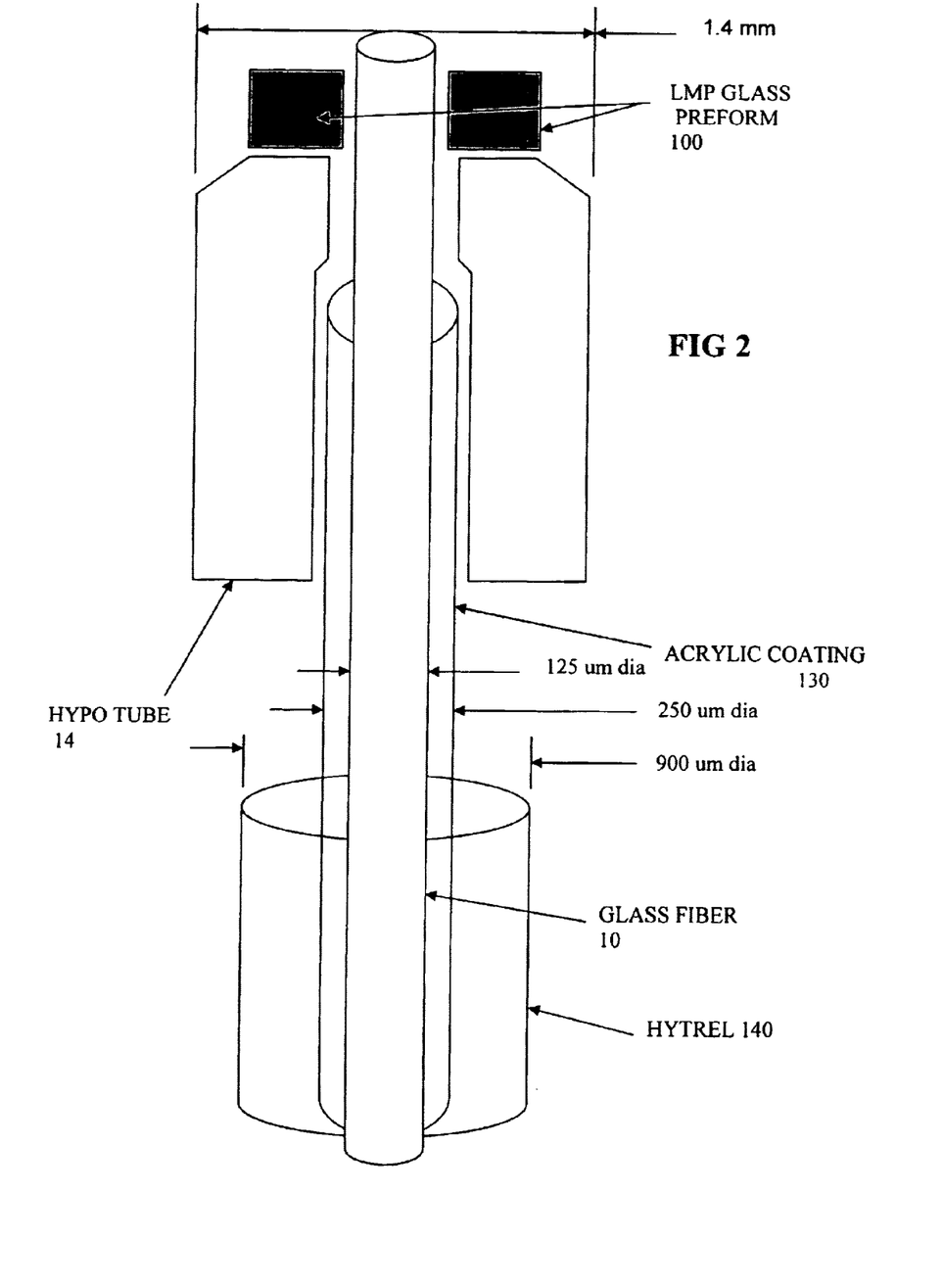
FIG. 2 shows an assembly including a fiber and hypo tube and a preform of the sealing composition, before melting to form a seal

FIG. 2. an Assembly Including Preform Before Melting to Form a Seal

FIG. 2 shows an assembly including a fiber and hypo tube and a preform 100 of the sealing composition, before melting to form a seal. Reference numerals corresponding to those of FIG. 1 have been used as appropriate. As shown, the preform in this case is a ring having suitable dimensions to slip over the fiber without slipping past the hypo tube, Clearly the preform can be other shapes depending on the shape of the gap to be sealed. The fiber also has an acrylic coating 130, and a Hytrel covering 140, both of which have been stripped off in the area of the seal. Approximate dimensions are shown for this example, these can be varied to suit the application. As shown, the hypo tube has a diameter of 1.4 mm, the fiber has a diameter of 125 um, the acrylic coated fiber has a diameter of 250 um, and the Hytrel covering for the fiber has a diameter of 900 um. The steps involved in assembling are described below with reference to FIG. 5. This assembly can be used in the arrangement of FIG. 1, or in other arrangements.

Figure 3:
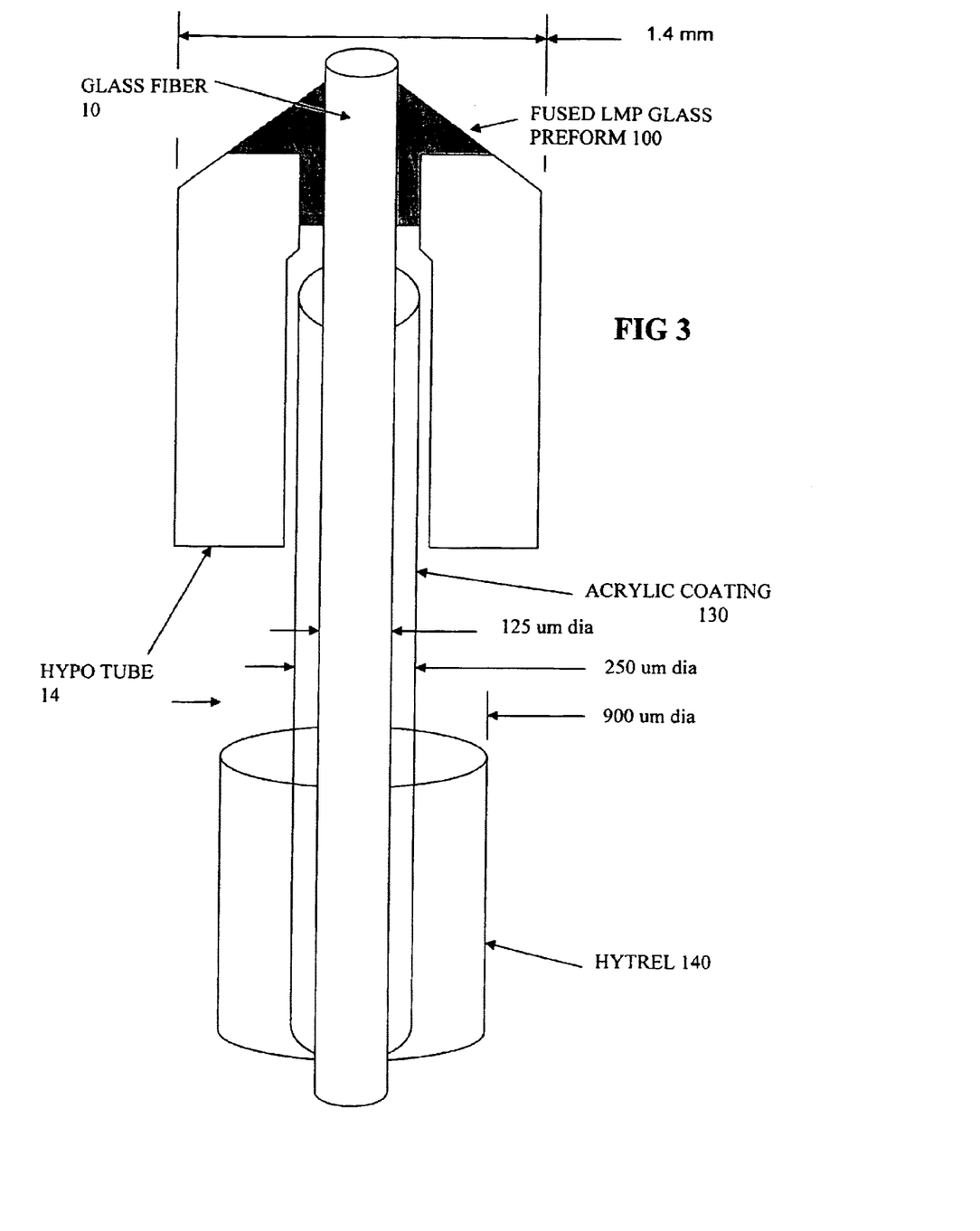
FIG. 3 shows the assembly of FIG. 2 after melting the preform to form a seal.

FIG. 3, an Assembly Including Preform after Melting to Form a Seal

FIG. 3 shows the assembly of FIG. 2 including a fiber and hypo tube and a preform 100 of the sealing composition, after the preform has been melted to flow into the gap to form a seal between the fiber and the hypo tube. The cross sectional shape of the seal depends on the viscosity of the melted preform, and the shape of the gap. Corresponding reference numerals to those used in FIGS. 1 and 2 have been used as appropriate.

Figure 4:
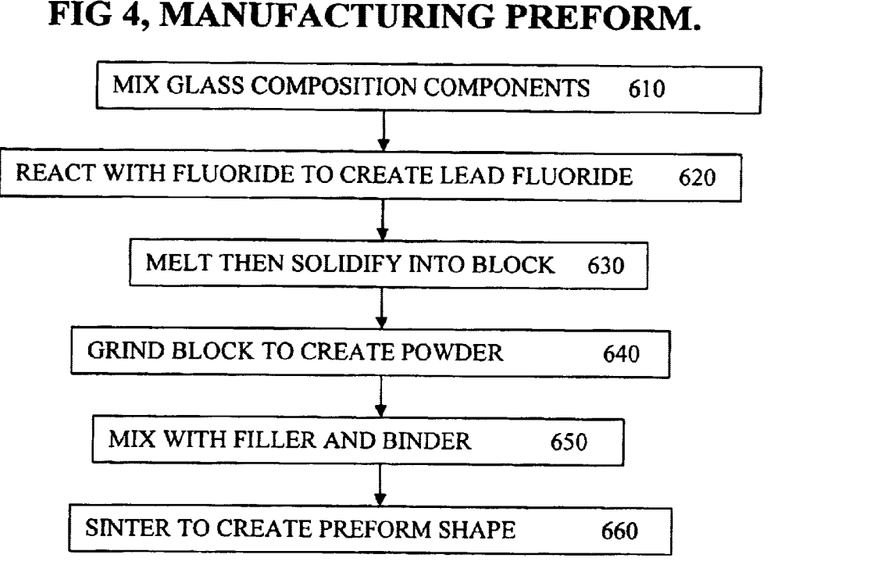
FIG. 4, shows steps in manufacturing the preform.
Figure 5:
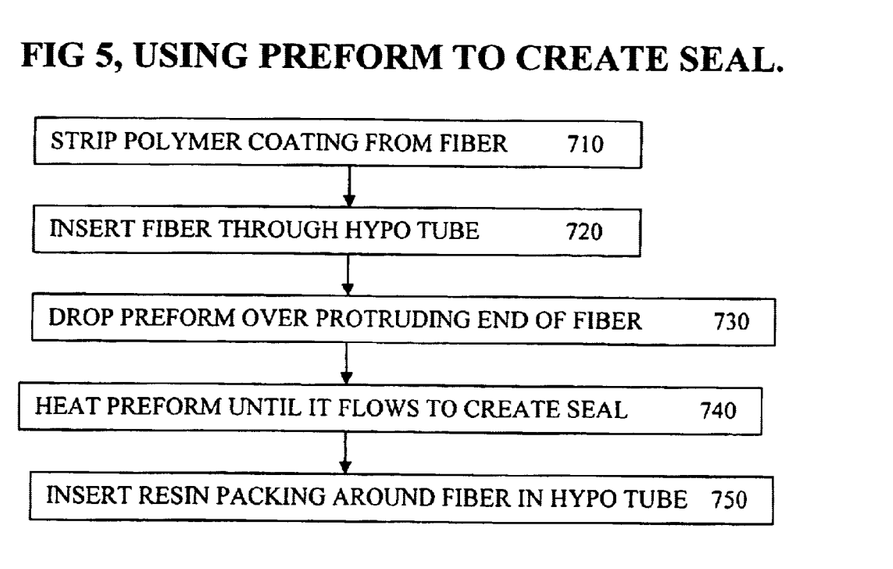
FIG. 5 shows steps in using the preform to create the seal.

FIGS. 4, 5, Illustrations of an Example of the Assembly of FIG. 3

FIG. 4 shows a cross section of an example of the assembly of FIG. 3, with corresponding reference numerals used as appropriate. FIG. 5 shows a perspective view.

FIG. 4 Steps in Manufacturing the Preform

FIG. 4 shows the principal steps in making the preform. At step 610, most of the components of the glass composition are mixed. At step 620, the mixture is reacted with ammonium bifluoride to create the lead fluoride component. At step 630 the resulting mixture is heated to melt it, preferably in a non reactive crucible of a material such as platinum. The melt is allowed to solidify into a block ready for grinding at step 640 to create a powder. At step 650, the glass composition powder is mixed with the appropriate amount of filler, and a conventional binder for the purpose of facilitating the subsequent sintering process. The preform is created at step 660 by sintering in a mould.

FIG. 5. Steps in using the Preform to Create the Seal

FIG. 5 shows steps in using the preform to create the seal. At step 710, the fiber is prepared by stripping the acrylic coating from the area to be sealed, and stripping the Hytrel covering from the area to be covered by the hypo tube. At step 720, the fiber is inserted into the hypo tube. At step 730, the preform is dropped onto the end of the fiber which protrudes from the hypo tube. This assembly is then inserted into a heater at step 740 to melt the preform to create the seal. This heating is preferably localised to avoid damage to the Hytrel and any other heat sensitive parts. An induction heater can be used, or a laser beam.

The assembly is placed within the jaws of an induction heater. The jaws conform sufficiently to the shape of the hypo tube surface to enable inductive currents to be generated within the Kovar tube. Typically, currents of 12 mA are cycled through the Kovar material for 10 to 15 seconds. These currents generate sufficient heat to melt the glass preform so that a strong adhesive bond is formed between the glass fiber and a portion of the interior surface of the Kovar hypo tube. The glass preform flows along the tube as it melts, thus enabling a relatively large bonding area to form. A cool down period of 10–15 seconds after switching off the induction current has been shown to provide good, hermetic joints. Typically, if the capillary gap between the glass fiber and the inner walls of the hypo tube is x mm, then the capillary action extends the bonding area up to around 3x mm along the direction of the hypo tube axis. This relatively large bonding area provides a high level of support to the fiber. Finally, resin packing is added around the fiber in the hypo tube.

A more detailed description of the process now follows.

a) Cooling pump for induction heater is turned on.
b) Induction heater is turned on, with power adjusted to 280 amps. The timer is adjusted to give a 12-second pulse.
c) The tube is placed onto a lab jack and aligned to pass between the jaws or tines of the induction heater when the lab jack is raised,
d) The lab jack is raised until the holder is parallel and between the induction heater tines. Further alignment is carried out such that the assembly is centered between the tines. The lab jack is adjusted until the holder is in contact with the base of the induction heater tines.
e) Carefully the test fixture is slid sideways, allowing the holder to slide in the fixture to lower into a fixture trough. A visual check is made to ensure that alignment is correct.
f) A clamp is slid carefully into a trough (beneath the holder) and secured to hold the holder firmly in place.
g) The induction heater is activated to cycle the heater for the preset 12-second pulse.
h) When the cycle is complete, the lab jack is carefully lowered, ensuring no contact between the heater tines and the glass fibers. The holder is moved back to its original position and the tube removed from the lab jack.
i) The induction heater and cooling pump are turned off.

Once assembled, samples of the seal can be subjected to a bend test to check the seal properties. The exposed fiber should be bent in a direction at right angles to the fiber orientation, 2 mm from the tip. The bend rate should be approximately 0.1 mm/sec for the first 0.5 mm, then rising to approximately 0.2 mm/sec. Acceptance criteria for the fiber is that no fiber should break at less than 0.5 mm deflection. The fiber should be bent to breaking point, then the seal inspected for separation of the seal from the fiber or the tube. A fuller explanation of the test procedure now follows.

a) One tube with fiber and cured preform is placed into a v-notch of a bend test fixture, allowing the tube to rest onto the base of the notch. The tube is secured in the notch.
b) A micrometer anvil is moved slowly until contact is made with the fiber.
c) The digital micrometer reading is set to zero.
d) Using a constant motion, the micrometer barrel is slowly turned, bending the fiber until the fiber breaks or until the micrometer reading reaches three mm.
e) The preform/fiber failure area is visually examined.

Concluding Remarks

As has been described, a glass composition for a seal consists essentially of 70–75 wt % of PbO, 3–7 wt % of $PbF_2$, 5–8 wt % of $Bi_2O_3$, 5–7 wt % of $B_2O_3$, 2–5 wt % of ZnO, 1–3 wt % of $Fe_2O_3$, 0–2 wt/% of CuO, 0–2% of $TeO_2$, and a trace <0.2% of $MnO_2$, the composition having a flow temperature of <350° C. Such seals can be flowed at low temperatures, using different and less environmentally damaging constituents to those used before. Damage to temperature sensitive materials near the seals, can be reduced. Low flow temperatures can be achieved without excessive degradation of properties such as low viscosity, low expansion coefficient, good adhesion to glass and metals, low permeability of air, good long term hydrolytic stability. A filler such as a ceramic powder, is added to match the temperature expansion coefficient to the materials being sealed. It can be used to fix silica fiber into electro-optic devices to achieve hermetic joints with high mechanical stability. Other variations will be apparent to those skilled in the art, having corresponding advantages to those set out above, within the scope of the claims.

What is claimed is:

1. A glass composition suitable for use as a component of a sealing composition, the glass composition consisting essentially of:

70–75 wt % of PbO,
3–7 wt % of $PbF_2$,
5–8 Wt % of $Bi_2O_3$,
5–7 wt % of $B_2O_3$,
2–7 wt % of ZnO,
1–3 wt % of $Fe_2O_3$,
0–2 wt % of CuO,
0–3 wt % of $TeO_2$, and
a trace <0.2 wt % of $MnO_2$, the composition having a flow temperature of <350° C.

2. The glass composition of claim 1, having a temperature coefficient of expansion of between 4 and 16 ppm/° C.

3. The glass composition of claim 1, having one or more of $V_2O_5$, $P_2O_5$, $TeO_2$, $SnO_2$, $Co_3O_4$, $Li_2O$, $As_2O_3$, $Sb_2O_3$.

4. The glass composition of claim 1, having 7 wt % $B_2O_3$, 8 wt % $Bi_2O_3$, 7 wt % ZnO, 5 wt % $PbF_2$, and 3 wt % $TeO_2$.

5. The glass composition of claim 1, having 6 to 7 wt % $B_2O_3$, 6 to 7 wt % $Bi_2O_3$, 3 to 4 wt % ZnO, 5 to 6 wt % F, 1 to 2 wt % $TeO_2$, 0.1 to 0.15 wt % $MnO_2$ 2 to 3 wt % $Fe_2O_3$ and 1 to 2 wt % CuO.

6. A sealing composition comprising 70–99 wt % of the glass composition of claim 1, and 1–30 wt % of a ceramic filler, the resulting combination of glass/tiller compositions having a TCE of 1 to 5 ppm/° C. and a flow temperature of less than 400° C.

7. The sealing composition of claim 6, having sufficient adhesion to glass and to metal to enable a glass fiber sealed to metal, to withstand a bend test of 3 mm deflection of the fiber, 2 mm away from the seal.

8. The sealing composition of claim 6 having a durability sufficient to maintain seal hermeticity <1×10−9 Atmos cc/s without optical power losses of packaged devices tested for 2000 hrs at 85° C. and 85% relative humidity.

9. A glass composition consisting essentially of:

70–75 wt % of PbO,
3–7 wt % of $PbF_2$,
5–8 wt % of $Bi_2O_3$
5–7 wt % of $B_2O_3$
2–5 wt % of ZnO
1–3 wt % of $Fe_2O_3$
0–2 wt % of CuO
0–2% of $TeO_2$
and a trace <0.2% of $MnO_2$.

10. A method of manufacturing the sealing composition of claim 6, comprising the steps of: mixing the PbO, and metal oxide components, and reacting the mixture with ammonium bifluoride to create $PbF_{21}$ and adding the low TCE ceramic filler.

11. A method of manufacturing a seal using the sealing composition of claim 6, comprising the steps of placing a preform of the sealing composition of claim 6 over a gap to be sealed, and applying localized heating to cause the preform to flow into the gap.

12. The method of claim 11, the localized heating being one of induction heating or laser heating.

13. An optical component having a fiber and a package, the fiber being sealed to the package using the sealing composition of claim 6.

* * * * *